(12) United States Patent
Hidaka et al.

(10) Patent No.: US 8,307,672 B2
(45) Date of Patent: Nov. 13, 2012

(54) GLASS SUBSTRATE PROCESSING METHOD AND GLASS COMPONENT

(75) Inventors: Takeshi Hidaka, Tokyo (JP); Yasushi Nakamura, Uenohara (JP); Tomonori Imamura, Tokyo (JP); Shinya Okamoto, Tokyo (JP); Hirotaka Koyo, Tokyo (JP); Yasuhiro Saito, Tokyo (JP); Keiji Tsunetomo, Tokyo (JP)

(73) Assignee: Olympus Corporation, Tokyo (JP)

( * ) Notice: Subject to any disclaimer, the term of this patent is extended or adjusted under 35 U.S.C. 154(b) by 606 days.

(21) Appl. No.: 12/091,168

(22) PCT Filed: Nov. 22, 2006

(86) PCT No.: PCT/JP2006/323366
§ 371 (c)(1),
(2), (4) Date: Apr. 22, 2008

(87) PCT Pub. No.: WO2007/061018
PCT Pub. Date: May 31, 2007

(65) Prior Publication Data
US 2009/0291261 A1     Nov. 26, 2009

(30) Foreign Application Priority Data
Nov. 22, 2005    (JP) ................................. 2005-336757

(51) Int. Cl.
*C03C 15/00*     (2006.01)
*C03C 23/00*     (2006.01)
(52) U.S. Cl. ........................................... 65/31; 65/30.1
(58) Field of Classification Search ...... 65/31; 427/540; 264/1.37, 482
See application file for complete search history.

(56) References Cited

U.S. PATENT DOCUMENTS

| 2,628,160 A | * | 2/1953 | Stookey | 216/87 |
| 3,920,951 A | * | 11/1975 | Chovan et al. | 219/121.6 |
| 4,518,222 A | * | 5/1985 | Borrelli et al. | 359/620 |
| 5,567,484 A | | 10/1996 | Baumgart et al. | 427/555 |
| 5,582,878 A | * | 12/1996 | Ogawa et al. | 427/554 |

(Continued)

FOREIGN PATENT DOCUMENTS
EP     0 652 554 A1    5/1995
(Continued)

OTHER PUBLICATIONS

Glezer, E.N. and Mazur, E. "Ultrafast-laser driven micro-explosions in transparent materials" Appl. Phys. Lett. (vol. 71) Issue 7, Jun. 16, 1997. pp. 884-887 as viewed at http://scitation.aip.org/getpdf/servlet/GetPDFServlet?filetype=pdf&id=APPLAB000071000007000882000001&idtype=cvips&prog=normal&doi=10.1063/1.119677 on Aug. 9, 2010.*

(Continued)

*Primary Examiner* — Matthew Daniels
*Assistant Examiner* — Jodi C Franklin
(74) *Attorney, Agent, or Firm* — Hogan Lovells US LLP (57) ABSTRACT

A glass substrate processing method includes irradiating laser light L onto a glass substrate 1 such that the laser light L is focused within the glass substrate 1, thereby forming a high density area 3 that has a higher density than areas where the laser light L is not irradiated around the portion where the laser light L is focused; and performing chemical etching on the glass substrate 1 using an etching solution such that at least a portion of the high density area is allowed to remain, thereby forming a projection 2 on a surface 1a of the glass substrate 1.

14 Claims, 4 Drawing Sheets

U.S. PATENT DOCUMENTS

| | | | |
|---|---|---|---|
| 5,879,424 A * | 3/1999 | Nishii et al. | 65/31 |
| 6,299,429 B1 * | 10/2001 | Xuan | 425/174.4 |
| 6,634,186 B2 * | 10/2003 | Abe | 65/105 |
| 7,354,526 B2 * | 4/2008 | Hidaka et al. | 216/80 |
| 7,619,227 B2 * | 11/2009 | Neukirch | 250/492.2 |
| 2002/0041946 A1 * | 4/2002 | Abe | 428/64.2 |
| 2004/0161913 A1 * | 8/2004 | Kawasaki et al. | 438/487 |
| 2005/0184035 A1 * | 8/2005 | Kurosawa et al. | 219/121.61 |
| 2008/0209950 A1 * | 9/2008 | Hidaka et al. | 65/319 |

FOREIGN PATENT DOCUMENTS

| | | |
|---|---|---|
| JP | 07-182655 | 7/1995 |
| JP | 11-096548 | 4/1999 |
| JP | 2002-160943 | 6/2002 |
| JP | 2002-210730 | 7/2002 |
| JP | 2004-035333 | 2/2004 |
| JP | 2004-359475 | 12/2004 |
| WO | 2004078668 A1 | 9/2004 |
| WO | WO/2004/078667 * | 9/2004 |

OTHER PUBLICATIONS

Notice of Reasons for Ejection; Mailing No. 584416; Mailing Date: Aug. 17, 2010; pp. 1-3. (English Translation of Office Action from related Japanese patent applications).

E.N. Glezer, Ultrafast-laser driven micro-explosions in transparent materials, Applied Physics Letters, Aug. 18, 1997, vol. 71, No. 7, p. 882-884.

Smuk Andrei Y et al: "Selective etching in laser written semiconductor-doped glasses", Optics Communications, North-Holland Publishing Co. Amsterdam, NL, vol. 156, No. 4-6, Nov. 15, 1998, pp. 297-299, XP004143077, ISSN: 0030-4018, DOI: 10.1016 /S0030-4018(98)00427-1.

Database Inspec [Online] The Institution of Electrical Engineers, Stevenage, GB; Oct. 8, 2004, Nakaya T et al: "Fabrication of precision microholes and structures with smooth surfaces by a high repetition rate femtosecond laser", XP000002656614, Database accession No. 9782700.

Supplementary European Search Report, date Aug. 10, 2011.

* cited by examiner

GLASS SUBSTRATE PROCESSING METHOD AND GLASS COMPONENT

BACKGROUND OF THE INVENTION

1. Field of the Invention

The present invention relates to a glass substrate processing method for forming a projection on a surface of a glass substrate or on a surface of a thin layer formed on a glass substrate, and to a glass component.

Priority is claimed on Japanese Patent Application No. 2005-336757, filed Nov. 22, 2005, the contents of which are incorporated herein by reference.

2. Description of Related Art

Conventionally, as a method of processing a surface of a glass substrate using laser light, a method is known for forming an area having a high etching rate on a glass substrate by irradiating laser light onto the predetermined area of the glass substrate, and performing an etching on the glass substrate so that this area is removed, whereby forming a depression on the surface of the glass substrate.

Specifically, they irradiate pulse laser light having an energy density of 5 to 50 $J/cm^2$ onto a transparent material for processing so as to include a surface of the material to be processed. Then, they perform an etching on the material for processing using a hydrofluoric acid solution having a relatively high concentration of 5.4 percent by weight, and remove the portions on which the laser light is irradiated so as to form holes (see, for example, JP2002-210730A). This publication discloses that the threshold value of the energy density for generating the structural changes necessary for the processing is 5 $J/cm^2$ when the material to be processed is quartz glass.

Moreover, a method is also known for forming alteration areas having a high etching rate inside a quartz substrate by irradiating pulse laser light onto the quartz substrate, and then performing an etching on these alteration areas using an etchant having a temperature of 30° C. that is obtained by adding 14% of glycerol to a 10% hydrofluoric acid solution (see, for example, JP2004-359475A). In this publication, it is suggested that the concentration of hydrofluoric acid as well as the etching temperature required for forming depressions is still higher when glycerol is not added to the hydrofluoric acid solution.

SUMMARY OF THE INVENTION

The first aspect of the glass substrate processing method in accordance with the present invention has the following characteristics. The first aspect in accordance with the present invention is a glass substrate processing method for forming a projection on a surface of a glass substrate that includes forming a high density area that has a higher density than areas where the laser light is not irradiated around the portion where the laser light is focused by irradiating laser light onto the glass substrate such that the laser light is focused within the glass substrate, and forming the projection on the surface of the glass substrate by performing chemical etching on the glass substrate using an etching solution such that at least a portion of the high density area is allowed to remain.

The first aspect of the glass substrate processing method in accordance with the present invention may be understood in the following manner. That is, by irradiating laser light having a predetermined energy intensity onto a glass substrate such that the laser light is focused within the glass substrate, the processing method forms an area having a higher etching rate in a predetermined etching solution than areas where the laser light is not irradiated around the portion where the laser light is focused. Next, the processing method forms a projection on a surface of the glass substrate by performing chemical etching on the glass substrate using an etching solution such that at least a portion of the aforementioned area is allowed to remain.

The second aspect of the glass substrate processing method in accordance with the present invention has the following characteristics. The second aspect in accordance with the present invention is a glass substrate processing method for forming a projection on a surface of a thin layer composed of one or more layers of inorganic material and formed on the glass substrate that includes forming a high density area that has a higher density than areas where the laser light is not irradiated around the portion where the laser light is focused by irradiating laser light onto the thin layer such that the laser light is focused within the thin layer, and forming the projection on a surface of the thin layer by performing chemical etching on the thin layer using an etching solution such that at least a portion of the high density area is allowed to remain.

The mechanism for forming a projection in the present invention may be thought to be based on the following principle. In order to simplify the description given below, a case is described in which laser light is irradiated onto a glass substrate.

When laser light having a predetermined energy intensity is irradiated onto a glass substrate so as to be focused within the glass substrate, the portion where the laser light is focused is heated by the laser light then expands. As a result, the pressure due to thermal expansion is applied to a region around the portion where the laser light is focused. However, still outer area of the region compressed through thermal expansion, in other words, a normal area where the laser light is not irradiated is not affected by laser heating. Therefore, the normal area constrains the region compressed through thermal expansion. As a result, a low density area having a lower density than the normal area where the laser light is not irradiated is formed in the portion where the laser light is focused, and a high density area having a higher density than the normal area where the laser light is not irradiated is formed around the low density area.

The etching rate of the high density area is lower than the etching rate of the normal area where the laser light is not irradiated. When performing chemical etching on such a glass substrate using an etching solution, at least a portion of the high density area that has low etching rate is left, whereby a projection is formed on the surface of the glass substrate.

This phenomenon is also reported in "Appl. Phys. Lett. 71 (7), 18 Aug., 1997" by E. N. Glezer and E. Mazur.

Furthermore, when laser light is irradiated onto a thin layer composed of one or more layers of inorganic material and formed on the glass substrate, a projection is formed on the surface of the thin layer by the same action as described above.

The second aspect of the glass substrate processing method in accordance with the present invention may further include performing etching on the thin layer and the glass substrate after the projection has been formed on the surface of the thin layer such that the projection formed on the thin layer is reflected on the glass substrate, thereby forming a new projection on the surface of the glass substrate.

A description will now be given of the energy intensity of the laser light in the present invention. If the energy intensity of the laser light is too low, then sufficient thermal expansion does not occur inside the glass substrate on which the laser light is irradiated. Therefore, it is unable to implement the processing method of the present invention. If, on the other hand, the energy intensity of the laser light is too high, then breaking of the glass network advances too far within the glass substrate onto which the laser light is irradiated. As a result, cracking occurs within the glass substrate. The optimum energy intensity for the laser light depends on the composition of the glass substrate onto which the laser light is irradiated. Therefore, a predetermined energy intensity for a particular glass composition may be clarified in advance through preliminary experiments or the like.

Moreover, the etching rate of the etching for the glass substrate may be higher than the etching rate of the etching for the thin layer.

In the present invention, it is preferable that the glass substrate, which is suitable for forming a low density area within the glass substrate and forming a high density area around the low density area, may include $SiO_2$ and 1 mol % or more of $Al_2O_3$, and a difference between the percentage content of the $SiO_2$ and the percentage content of the $Al_2O_3$ (i.e., the $SiO_2$ percentage content—the $Al_2O_3$ percentage content) may be 40 mol % or more and 67 mol % or less, and more preferably 47 mol % or more and 57 mol % or less.

The laser light of the present invention may be pulse laser light. Furthermore, in the present invention, the energy intensity of single pulse of laser light per unit area at a focal position of the pulse laser light may be less than 150 $J/cm^2$. In the above, the energy intensity of single pulse of laser light per unit area at a focal position of the pulse laser light may be more than 5 $J/cm^2$.

Furthermore, such glass substrate may be favorably applied to the present invention, in which the difference between the percentage content of the $SiO_2$ and the percentage content of the $Al_2O_3$ (i.e., the $SiO_2$ percentage content—the $Al_2O_3$ percentage content) is 40 mol % or more and 67 mol % or less, and whose composition also falls within the range given below.

| | |
|---|---|
| $SiO_2$: | 55 to 72 mol % |
| $Al_2O_3$: | 1 to 15 mol % |
| (MgO + CaO + SrO + BaO): | 2 to 16 mol % |
| $Li_2O$: | 5 to 20 mol % |
| $Na_2O$: | not more than 12 mol % |

In the glass substrate with the above composition, the $Al_2O_3$ is easily leached in an acidic etching solution that includes hydrofluoric acid, so that etching is promoted.

A description will now be given of the etching solution used in the present invention. The concentration of hydrofluoric acid as the etching solution in the present invention is preferably lower than the concentration of hydrofluoric acid as an ordinary etching solution for silica glass. Specifically, the etching solution may be a hydrofluoric acid solution with not more than two percent by weight of concentration.

DESCRIPTION OF THE PREFERRED EMBODIMENTS

Confirmation Experiment

The following experiment was conducted in order to confirm the mechanism for forming projections in the present invention. Firstly, A glass substrate having the composition A shown in Table 1 was used as a processing subject. The laser light meeting the irradiation conditions described below was then irradiated onto the glass substrate centering on a depth of approximately 15 μm from the surface of the glass substrate. The surface profile of the glass substrate was measured using a three-dimensional measuring instrument (NH-3, manufactured by Mitaka Kohki Co., Ltd.) prior to the laser light irradiation and also subsequent to the laser light irradiation and two profiles were compared. Both of them were flat and no changes caused by laser light irradiation could be recognized.

Laser Light Irradiation Conditions

| | |
|---|---|
| Wavelength: | 800 nm |
| Pulse width: | 150 fs |
| Frequency: | 1000 Hz |
| Energy intensity: | 217 $J/cm^2$ |

Next, etching of approximately 10 μm was performed on the glass substrate where laser light has been irradiated using a hydrofluoric acid solution with 0.1 percent by weight of concentration at a temperature of 40° C. As a result, it was confirmed that a projection having a height of 85 nm was formed on the surface of the glass substrate with the region around the portion where the laser light was focused being left. The surface profile of the glass substrate on which the projection has been formed is shown in FIG. 5.

When further etching was performed on this glass substrate, the projection formed on the surface could no longer be recognized, and it was, rather, observed that a depression having a depth of approximately 2 μm had been formed. The surface profile of the glass substrate in which the depression has been formed is shown in FIG. 6.

Figure 5:
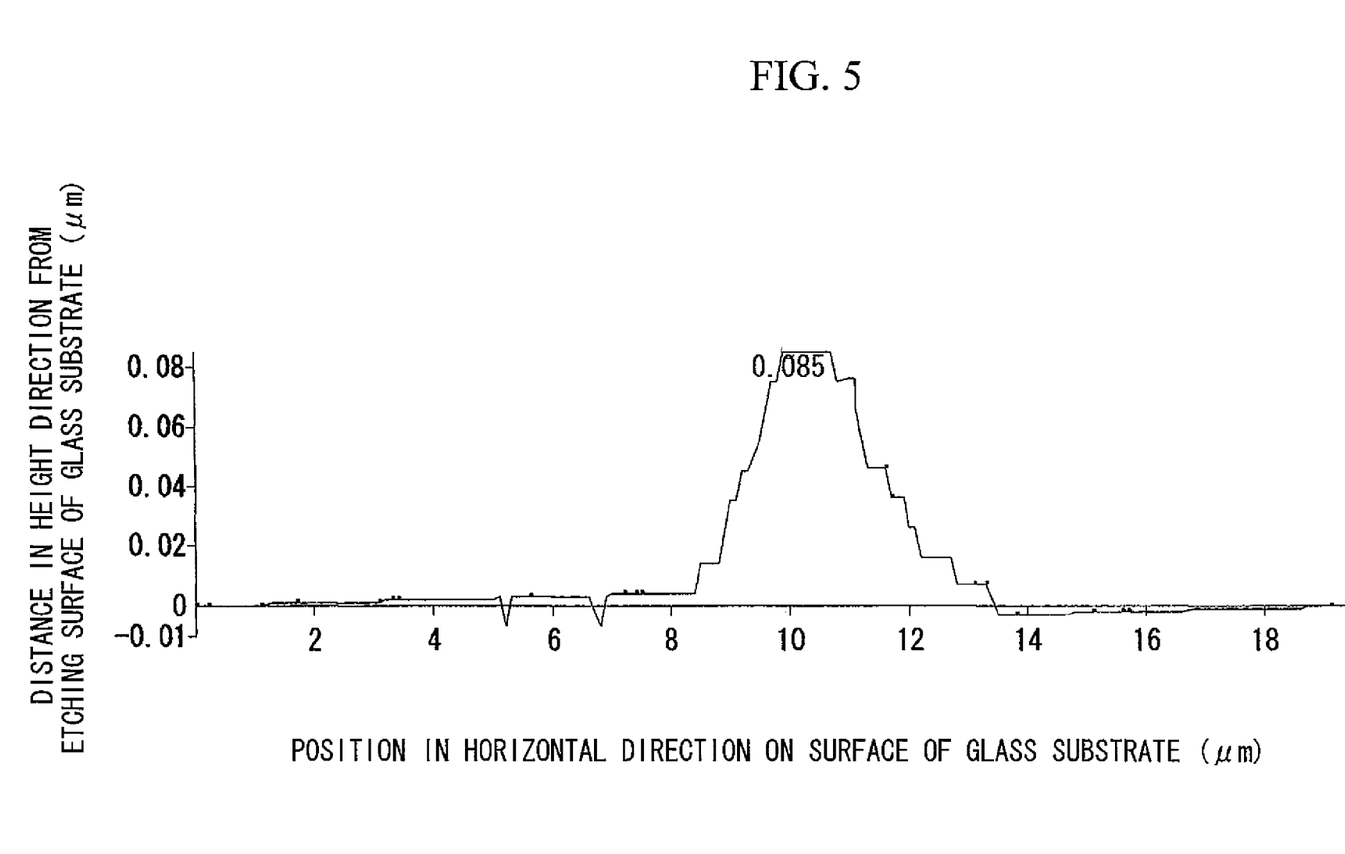
FIG. 5 is measurement results that show a surface profile of a glass substrate that has been measured by a confirmation experiment.
Figure 6:
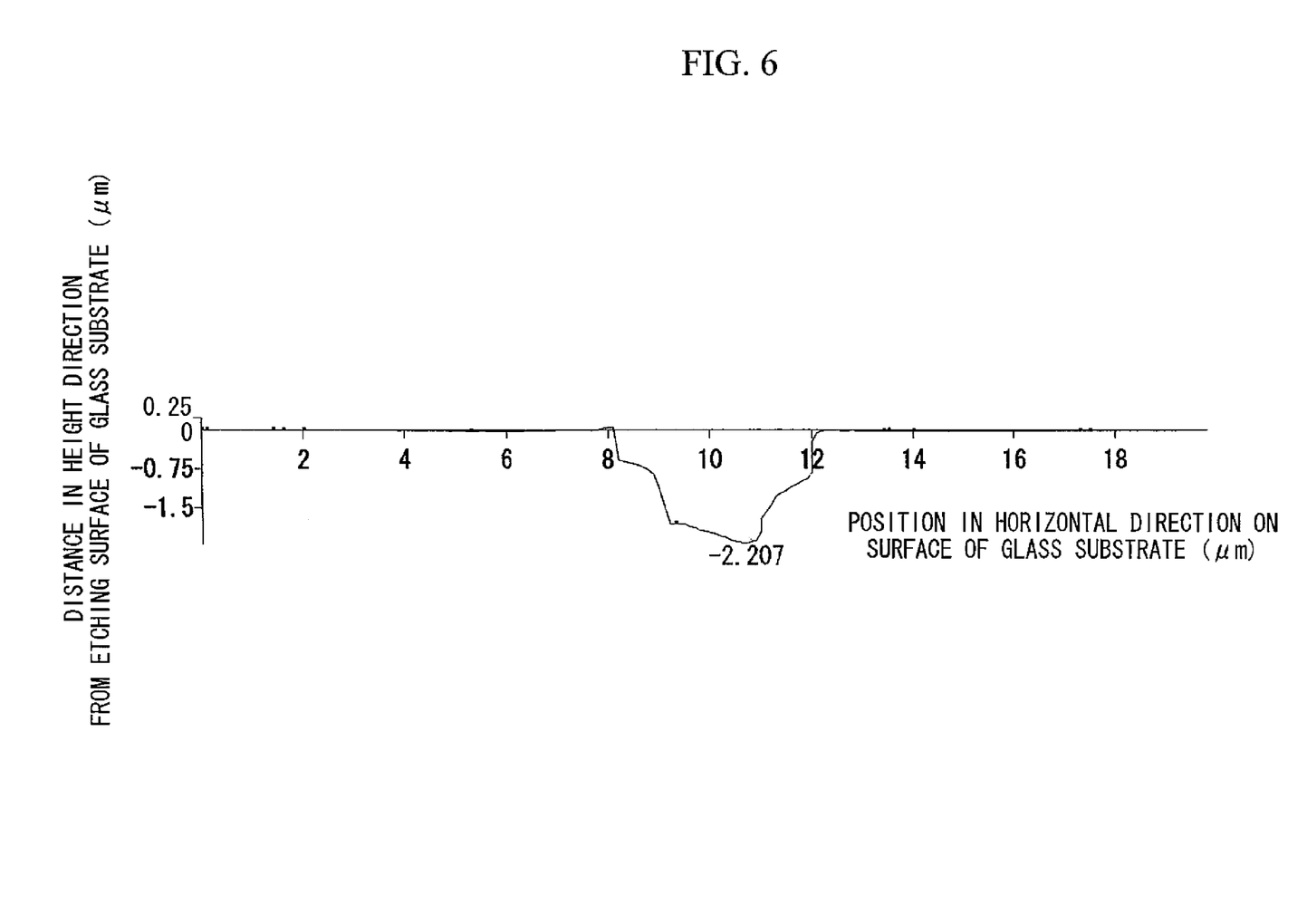
FIG. 6 is measurement results that show a surface profile of a glass substrate that has been measured by a confirmation experiment.

Note that, in FIGS. 5 and 6, the vertical axis shows the distance in the height direction from the etched surface of the glass substrate, while the horizontal axis shows the position in the horizontal direction on the surface of the glass substrate. In either drawing, when the value on the vertical axis is +(positive), this shows that a projection is formed on the surface of the glass substrate, while when this value is −(negative), this shows that a depression is formed in the surface of the glass substrate.

From the above results, it can be analyzed that the projection formation mechanism of the present invention is feasible. That is, the region around the portion where laser light is focused has a higher density than the normal area where laser light has not been irradiated, and, as a result, such region is difficult to be etched. In contrast, the portion where laser light has been focused has a lower density than normal area where laser light has not been irradiated, and, as a result, such portion is easily etched.

First Embodiment

Figure 1:
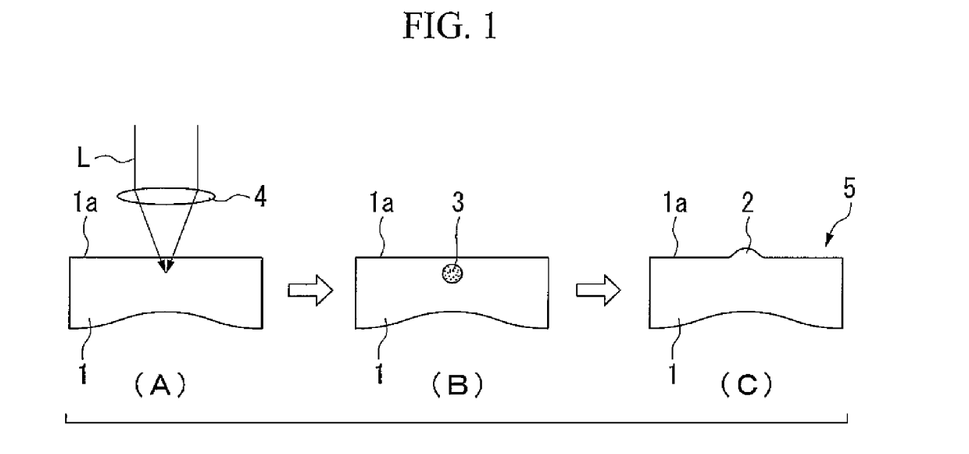
FIG. 1 is a view showing a first embodiment of the glass substrate processing method of the present invention, and is a schematic view showing each step for forming a projection on a surface of a glass substrate.

A first embodiment of the glass substrate processing method of the present invention will now be described with reference made to FIG. 1.

The glass substrate processing method of the present embodiment is a method of forming a projection 2 on a surface 1*a* of a planar glass substrate 1, and includes a laser light irradiation step and a projection formation step.

In the laser light irradiation step of the present embodiment, pulse laser light L as laser light is irradiated onto the glass substrate 1 such that it is focused within the glass substrate 1. As a result, a high density area 3 that has a higher density than a normal area where the pulse laser light L is not irradiated is formed around the portion where the pulse laser light L is focused.

The projection formation step of the present embodiment is performed after the laser light irradiation step, and is the step for performing chemical etching on the glass substrate 1 using a hydrofluoric acid (HF) solution as an etching solution such that at least a portion of the high density area 3 is left. As a result, the projection 2 is formed on the surface 1*a* of the glass substrate 1.

Note that the high density area 3 does not have a uniform high density. The density inside the high density area 3, that is, the density of the portion where the pulse laser light L is focused is lower than that in the normal area where the pulse laser light L is not irradiated, and the density of the shell portion of the high density area 3, that is, the density of the region around the portion where the pulse laser light L is focused is higher than that in the normal area where the pulse laser light L is not irradiated. However, in the present embodiment, an area consisting of the shell portion and the internal portion is called as the high density area.

Each of the above steps will now be described in more detail.

In the present embodiment, a glass matrix (i.e., aluminosilicate glass) that includes $SiO_2$ and 1 mol % or more of $Al_2O_3$ and in which the difference between the percentage content of the $SiO_2$ and the percentage content of the $Al_2O_3$ (i.e., the $SiO_2$ percentage content—the $Al_2O_3$ percentage content) is 40 mol % or more and 67 mol % or less is used for the glass substrate 1 to be processed. Such a glass matrix is a favorable substance for effectively forming the projection 2 on the surface 1*a* of the glass substrate 1 by performing chemical etching thereon by an acidic solution.

The glass matrix is a multicomponent glass, and contains $SiO_2$ as the main component and 1 mol % or more of $Al_2O_3$. In this type of glass matrix, because $Al_2O_3$ is easily leached in an acidic solution, etching is promoted. Moreover, as the difference between the percentage content of the $SiO_2$ and the percentage content of the $Al_2O_3$ (i.e., the $SiO_2$ percentage content—the $Al_2O_3$ percentage content) is reduced, that is, as the percentage content of the $Al_2O_3$, which is less acid resistant, is relatively increased, the leaching is further promoted, increasing the etching rate rapidly.

The pulse laser light L that is used in the present embodiment is ultra short pulse laser light having a wavelength of 800 nm, a pulse width of 150 fs, a frequency of 1000 Hz, and an energy intensity of 13 $J/cm^2$.

Firstly, the laser light irradiation step described above is performed. As shown in step (A) in FIG. 1, the pulse laser light L having the aforementioned energy intensity is irradiated onto the glass substrate 1 from above the glass substrate 1, and the pulse laser light L within the glass substrate 1 using the condenser lens 4. At this time, the pulse laser light L is irradiated such that its focal point lies at a depth of 10 µm from the surface 1*a* of the glass substrate 1. Moreover, by selecting the optimum magnification of the condenser lens 4, the energy intensity of the pulse laser light L at the focal point is regulated less than 300 $J/cm^2$. Accordingly, as shown in step (B) in FIG. 1, the high density area 3 which has a higher density than the normal area where the pulse laser light L is not irradiated, is formed around the portion where the pulse laser light L is focused within the glass substrate 1.

Thus formed high density area 3 exhibits different chemical properties from the normal area where the pulse laser light L is not irradiated, and, when chemical etching is performed using an acidic solution, an etching rate difference is generated between the high density area 3 and the normal area. Specifically, the etching rate of the high density area 3 is lower than the etching rate of the normal area (i.e., the high density area 3 is difficult to be etched).

After the above described laser light irradiation step, the projection formation step is performed. As shown in step (C) in FIG. 1, the glass substrate 1 in which the high density area 3 has been formed is immersed in a hydrofluoric acid (HF) solution having a concentration of 0.2 percent by weight so that chemical etching by 8 µm is performed on the glass substrate 1. Accordingly, the projection 2 having a height of approximately 1.5 µm is formed on the surface 1*a* of the glass substrate 1. As a result, a glass component 5 is manufactured that is the glass substrate 1 on the surface 1*a* of which the projection 2 has been formed.

According to the glass substrate processing method of the present embodiment, by performing the above described laser light irradiation step and projection formation step, the projection 2 can be formed easily at a desired position on the surface 1*a* of the glass substrate 1.

Moreover, by using the pulse laser light L when performing the laser light irradiation step, relatively minute high density area 3 can be formed. In addition, by setting the focal point of the laser light L within the glass substrate 1, the high density area 3 can be formed easily in the depth direction within the glass substrate 1. Furthermore, because the shape of the portion where the pulse laser light L is focused can be changed easily by changing the numerical aperture and magnification of the condenser lens 4, a high density area 3 having an intricate shape can be formed easily. Accordingly, a projection 2 having a relatively intricate shape can be formed with high precision.

Because a projection 2 having a relatively minute and intricate shape is formed on the glass component 5 that is manufactured using the glass substrate processing method of the present embodiment, this glass component 5 can be employed in a variety of applications.

Note that in order to maintain the water resistance of the glass substrate 1 of the present embodiment, the difference between the percentage content of the $SiO_2$ and the percentage content of the $Al_2O_3$ (i.e., the $SiO_2$ percentage content—the $Al_2O_3$ percentage content) may be preferably 40 mol % or more. The difference between the percentage content of the $SiO_2$ and the percentage content of the $Al_2O_3$ may be more preferably 47 mol % or more in order that a high projection 2 can be formed efficiently even with a relatively small amount of etching.

On the other hand, the difference between the percentage content of the $SiO_2$ and the percentage content of the $Al_2O_3$ may be preferably 67 mol % or less in order to restrain any decrease in acid resistance that is caused by adding a large quantity of $Al_2O_3$ to the glass substrate 1, and also to prevent the melting temperature of the glass substrate 1 from rising, whereby keeping the melting temperature relatively low and enhancing the homogeneity of the composition. The difference between the percentage content of the $SiO_2$ and the percentage content of the $Al_2O_3$ may be more preferably 57 mol % or less in order that a high projection 2 can be formed efficiently even with a relatively small amount of etching.

Moreover, $SiO_2$ is a fundamental component constituting the glass substrate 1 and then the percentage content of the $SiO_2$ may be preferably 40 mol % or more in order to endow the glass substrate 1 with chemical durability and also to improve the ability for the projection to be formed on the glass substrate 1. In contrast, although it is necessary for the percentage content of $Al_2O_3$ to be 1 mol % or more, the upper limit for the percentage content of $Al_2O_3$ may be preferably 15 mol % because $Al_2O_3$ is an element which ensures the glass substrate 1 solubility and that creates a homogeneous glass substrate and in order that unevenness is not generated in the ability for the projection to be formed on the glass substrate 1 irrespective of the location where the projection is formed.

In the present embodiment, a glass matrix which includes $SiO_2$ and 1 mol % or more of $Al_2O_3$ and in which the difference between the percentage content of the $SiO_2$ and the percentage content of the $Al_2O_3$ (i.e., the $SiO_2$ percentage content—the $Al_2O_3$ percentage content) is 40 mol % or more and 67 mol % or less for the glass substrate 1 was used. However, the glass substrate 1 is not limited to such a glass matrix and it is also possible to use glass that contains $SiO_2$ as the main component and contains at least $Al_2O_3$ (i.e., aluminosilicate glass). The type of the glass substrate 1 is not particularly limited to aluminosilicate glass as long as a high density area 3 having lower etching rate can be easily formed by irradiating the pulse laser light L and the projection 2 can be subsequently formed on the surface 1*a* of the glass substrate 1 by performing etching.

As for the types of the glass substrate 1, in addition to the aforementioned aluminosilicate glass, aluminoborosilicate glass or borosilicate glass or the like may be selected.

Moreover, in the present embodiment, a hydrofluoric acid solution having a concentration of 0.2 percent by weight was used as the etching solution, however, the concentration of the hydrofluoric acid is preferably 2 percent or less by weight and more preferably 1 percent or less by weight. It is required of the acid solution used for the etching solution that components other than the $SiO_2$ may be selectively leached from the glass substrate 1 into the solution. Furthermore, it is required that the leaching amounts due to the chemical etching using the etching solution may be different between the high density area 3 and the normal area. Therefore, it is preferable for the etching solution to be an aqueous solution having a pH of 5 or less. The components that are selectively leached from the glass substrate 1 by chemical etching are those such as $Al_2O_3$ that have low acid resistance, thus the etching solution is required to be acidic. An acidic solution containing fluoride ions, for example, a hydrofluoric acid solution can be used for this type of etching solution. Moreover, it is also possible to use a solution obtained by adding at least one type of acid selected from sulfuric acid, hydrochloric acid, nitric acid, phosphoric acid, sulfamic acid, oxalic acid, tartaric acid, malic acid, and citric acid to the above described acidic etching solution.

Moreover, in the present embodiment, pulse laser light L was used, however, other types of laser light than pulse laser light may be used as far as an excellent high density area 3 can be formed.

Moreover, when the pulse laser light L is used, the pulse width, frequency, irradiation time, and energy intensity can be optionally set depending on the focal position of the pulse laser light L and the desired shape of high density area 3. In particular, by controlling the pulse width and irradiation time, an excellent high density area 3 can be formed without causing any damage to the glass substrate 1. The focal position of the pulse laser light L can be optionally set depending on the desired shape of the projection 2.

Second Embodiment

Next, a second embodiment of the glass substrate processing method of the present invention will be described with reference made to FIG. 2. Note that in the second embodiment, elements that are the same as those in the first embodiment are given the same descriptive symbols and a description thereof is omitted.

The second embodiment differs from the first embodiment in the following point. In the first embodiment, the projection 2 is directly formed on the surface 1*a* of the glass substrate 1. In contrast, in the second embodiment, a thin layer 11 is formed on a glass substrate 10 and a projection 12 is formed on a surface 11*a* of the thin layer 11. Thereafter, a projection 22 is formed on a surface 10*a* of the glass substrate 10 by reflecting the shape of the projection 12 on the glass substrate 10.

The glass substrate processing method of the present embodiment is particularly suitable when the glass substrate 10 to be processed is a material difficult to process through thermal deformation. Such glass substrate includes a crystallized glass, a quartz glass, an athermal glass and the like, having low thermal expansion and high transparency.

The processing through thermal deformation is meant by the method for pressing a mold processed into a desired shape onto the glass softened by heat such that the shape is transferred to the glass, and cooling down the glass so as to solidify the glass, whereby finally obtaining the glass in the desired form. Therefore, the material difficult of press-molding includes a glass substrate difficult to form the high density area by irradiating the laser light and the like.

The glass substrate processing method of the present embodiment is a method of forming the projection 22 on the surface 10*a* of the glass substrate 10, and includes a laser light irradiation step, a projection formation step and a projection reflecting step.

In the laser light irradiation step of the present embodiment, pulse laser light L is irradiated onto a thin layer 11 composed of an inorganic material and formed on the planar glass substrate 10 such that it is focused within the thin layer 11. As a result, the high density area 13 which has a higher density than a normal area where the pulse laser light L is not irradiated is formed around the portion where the pulse laser light L is focused.

The projection formation step of the present embodiment is performed after the laser light irradiation step, and is the step for performing chemical etching on the thin layer 11 such that at least a portion of high density area 13 is left. As a result, the projection 12 is formed on the surface 11*a* of the thin layer 11.

The projection reflecting step of the present embodiment is performed after the projection formation step, and is the step for performing etching on the thin layer 11 and the glass substrate 10 so that the projection 12 is reflected onto the glass substrate 10. As a result, a new projection 22 is formed on the surface 10a of the glass substrate 10.

Each of these steps is described below in detail.

In the present embodiment, a planar crystallized glass (referred to below as the crystallized glass 10) is used for the glass substrate 10 to be processed on whose surface 10a the projection 22 is ultimately formed.

Figure 2:
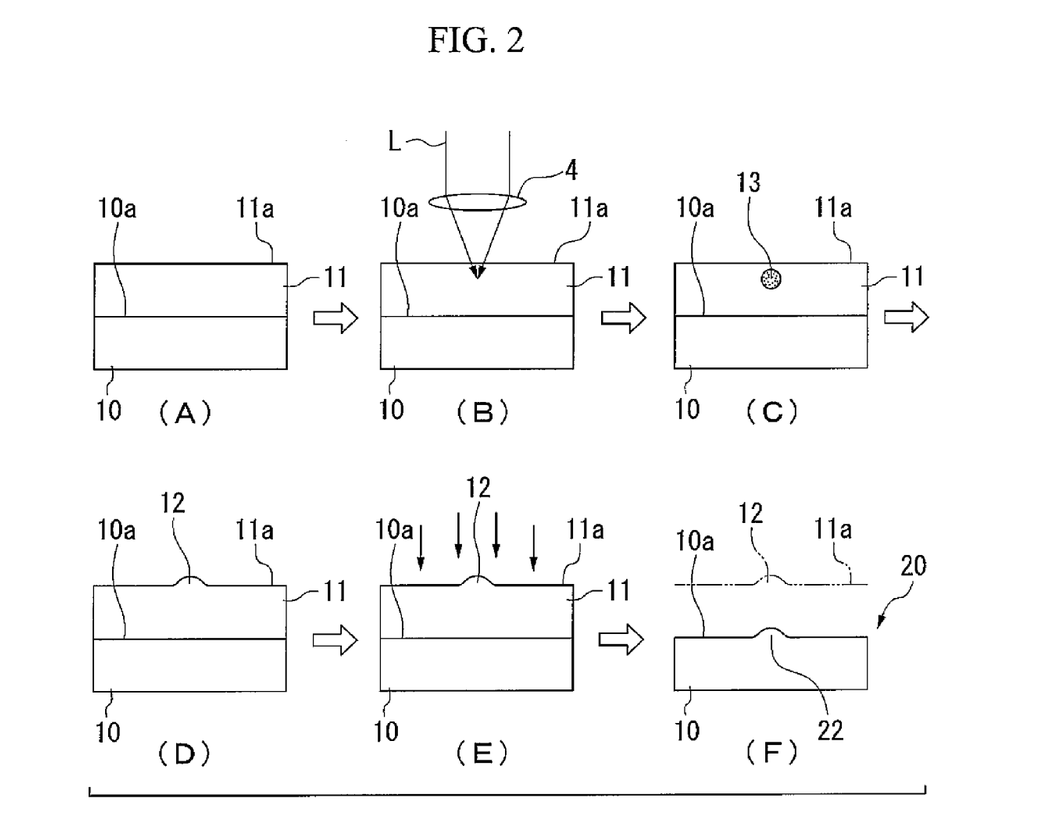
FIG. 2 is a view showing a second embodiment of the glass substrate processing method of the present invention, and is a schematic view showing each step for forming a projection on a surface of a glass substrate via a thin layer.

In order to form the projection 22 on the surface 10a of the crystallized glass 10, firstly, as is shown in step (A) in FIG. 2, a thin plate with a thickness of approximately 50 μm composed of an inorganic material is adhered to the surface 10a of the crystallized glass 10 using an adhesive agent (not shown) that can be removed by etching. As a result, the thin layer 11 as a processing layer is formed on the crystallized glass 10. The thin layer 11 is, for example, of the same glassy material as the glass substrate 1 which is to be processed in the above described first embodiment.

Next, the laser light irradiation step described above is performed. As shown in step (B) in FIG. 2, the pulse laser light L having a predetermined energy intensity is irradiated onto the thin layer 11 from above the crystallized glass 10 and the thin layer 11, and the pulse laser light L is focused within the thin layer 11 using the condenser lens 4. As a result, as is shown in step (C) in FIG. 2, the high density area 13 that has a higher density than the normal area where the pulse laser light L is not irradiated, is formed around the portion where the pulse laser light L is focused within the thin layer 11.

After the above described laser light irradiation step, we perform the above described projection formation step. As shown in step (D) in FIG. 2, the thin layer 11 in which the high density area 13 has been formed is immersed in an acidic solution such as hydrofluoric acid or the like so that chemical etching is performed on the thin layer 11. As a result, the projection 12 is formed on the surface 11a of the thin layer 11.

Next, the above described projection reflecting step is performed. As shown in step (E) in FIG. 2, ion etching is performed on the crystallized glass 10 and thin layer 11 on whose surface 1 lathe projection 12 has been formed. Ion etching has excellent reproducibility and homogeneity and is effective for etching the inactive material, for example, the material difficult to etch by chemical etching using an acidic solution. Ion etching is also effective for etching composite materials. Accordingly, when the ion etching is performed on the crystallized glass 10 and thin layer 11 on whose surface 11a the projection 12 has been formed, as is shown in step (F) in FIG. 2, the shape of the projection 12 that is formed on the surface 11a of the thin layer 11 is reflected on the crystallized glass 10 as it is. That is, a new projection 22 is formed on the surface 10a of the crystallized glass 10. As a result, a glass component 20 is manufactured which is the crystallized glass 10 on whose surface 10a the projection 22 has been formed.

According to the glass substrate processing method of the present embodiment, by performing the above described laser light irradiation step and projection formation step, the projection 12 can be formed easily at a desired position on the surface 11a of the thin layer 11.

Moreover, by using the pulse laser light L when performing the laser light irradiation step, relatively minute high density area 13 can be formed easily. In addition, by setting the focal point of the laser light L within the thin layer 11, the high density area 13 can be formed easily in the depth direction within the thin layer 11. Furthermore, because the shape of the portion where the pulse laser light L is focused can be changed easily by changing the numerical aperture and magnification of the condenser lens 4, a high density area 13 having an intricate shape can be formed easily. Accordingly, a projection 12 having a relatively intricate shape can be formed with high precision.

Furthermore, by performing the above described projection reflecting step, the projection 22 having a relatively minute and intricate shape can be formed on the surface 10a of even a crystallized glass 10 difficult to form a high density area 13 having a lower etching rate than a normal area therein.

Moreover, because the projection 22 having a relatively minute and intricate shape is formed on the glass component 20 that is manufactured using the glass substrate processing method of the present embodiment, this glass component 20 can be employed in a variety of applications.

Note that in the present embodiment, in order to reflect the projection 12 that is formed on the surface 11a of the thin layer 11 on the crystallized glass 10 as it is, the whole thin layer 11 was removed by ion etching, however, a portion of the thin layer 11 may be left unetched if necessary.

In the present invention, 'the reflecting of the projection on a glass substrate' is not limited to the mode shown in step (F) in FIG. 2. For example, it is also possible to use a crystallized glass 10 whose etching rate in the above described ion etching is higher than that of the thin layer 11. In this case, because the crystallized glass 10 is etched faster than the thin layer 11, it is possible to easily form a projection 22 having a high aspect ratio configuration on the surface 10a of the crystallized glass 10.

Moreover, in the projection reflecting step of the present embodiment, ion etching which is a kind of dry etching is employed, however, wet etching may be employed instead of dry etching as far as both the thin layer 11 and the crystallized glass 10 can be removed. The chemical etching that is performed in the projection formation step may be continued.

The glass substrate processing method of the present embodiment is effective, for example, when the material to be processed is crystallized glass or the like difficult to form a high density area.

Note that in the present embodiment, the thin layer 11 as a processing layer is formed on the crystallized glass 10 by adhering a thin plate composed of an inorganic material onto the surface 10a of the crystallized glass 10, however, the thin layer 11 may be formed using some other technique as far as the same characteristics as those of the glass substrate 1 of the first embodiment can be obtained with regard to the formation of the high density area 13 and the chemical etching. Moreover, in the present embodiment, the thin layer 11 composed of only one layer is formed on the crystallized glass 10, however, the thin layer composed of a plurality of layers may also be formed on the crystallized glass 10 and a high density area may also be formed within any one of the plurality of layers.

In the present embodiment, the pulse laser light L was used as well as in the first embodiment, however, other types of laser light than pulse laser light may be formed as far as an excellent high density area 13 can be formed.

Moreover, when we use the pulse laser light L is used, the pulse width, frequency, irradiation time, and energy intensity can be optionally set depending on the focal position of the pulse laser light L and the desired shape of high density area 13. In particular, by controlling the pulse width and irradiation time, an excellent high density area 13 can be formed without causing any damage to the thin layer 11. The focal position of the pulse laser light L can be optionally set depending on the desired shape of the projection 12 or the projection 22.

In addition, in the glass substrate processing method of the present embodiment, the characteristics of the laser light irradiated onto the thin layer 11 and the irradiation conditions, as well as the constituents of the etching solution and the etching conditions may be the same as those in the first embodiment.

Third Embodiment

Figure 3:
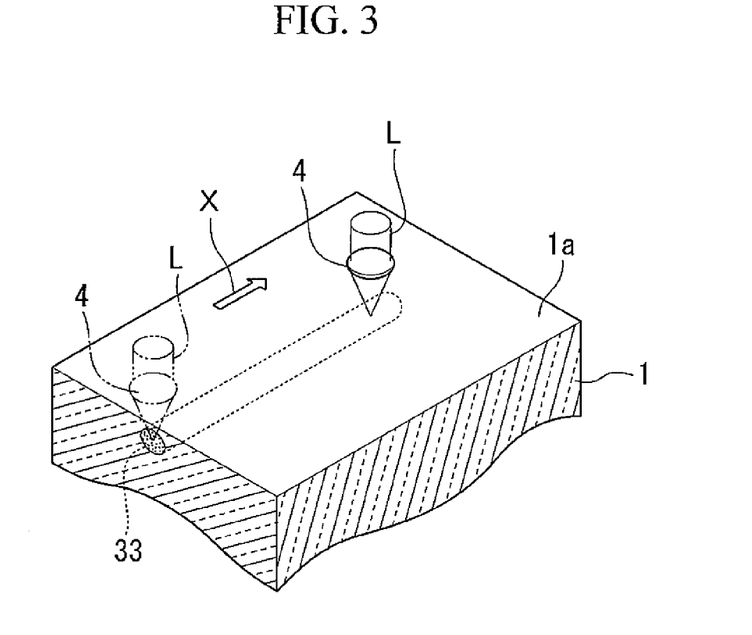
FIG. 3 is a view showing a third embodiment of the glass substrate processing method of the present invention, and is a schematic view showing the step for linearly scanning a glass substrate by pulse laser light.
Figure 4:
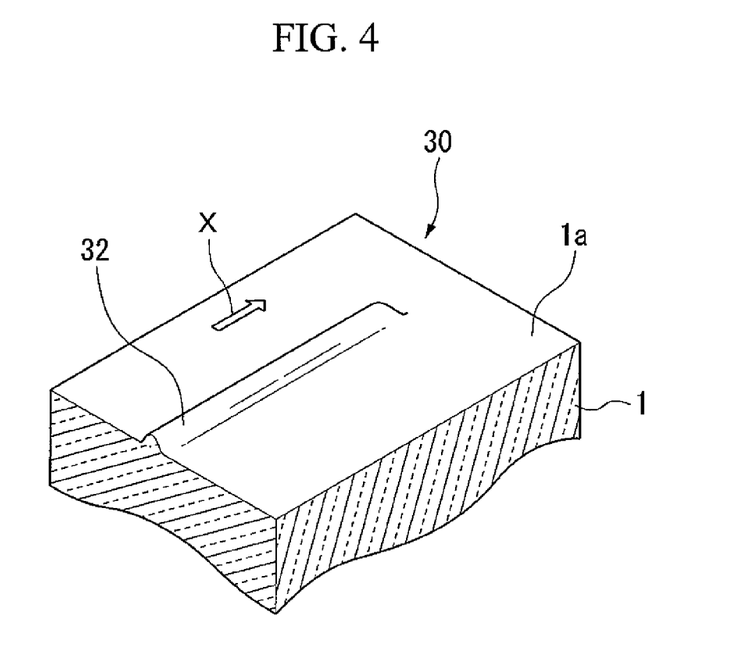
FIG. 4 is a view showing a third embodiment of the glass substrate processing method of the present invention, and is a schematic view showing a glass component which is a glass substrate on the surface of which a striated projection has been formed.

Next, the third embodiment of the glass substrate processing method of the present invention will be described with reference made to FIGS. 3 and 4. Note that, in the third embodiment, elements that are the same as those in the first embodiment are given the same descriptive symbols and a description thereof is omitted.

The third embodiment differs from the first embodiment in the following point. In the first embodiment, during the laser light irradiation step, the pulse laser light L is only irradiated onto the glass substrate 1. In contrast to this, in the third embodiment, the focal position of the pulse laser light L is scanned in the glass substrate 1.

In the present embodiment, during the laser light irradiation step, the pulse laser light L is moved in at least one of the directions that is parallel with and perpendicular to the surface 1a of the glass substrate 1. Here, as is shown in FIG. 3, the pulse laser light L with the aforementioned energy intensity is irradiated onto the glass substrate 1 from above the glass substrate 1, and the glass substrate 1 is scanned by moving the pulse laser light L in the direction that is parallel with the surface 1a of the glass substrate 1 (i.e., the X direction in FIG. 3) while focusing the pulse laser light L within the glass substrate 1 using the condenser lens 4. As a result, a high density area 33 is formed continuously in the scanning direction of the pulse laser light L.

After the above described laser light irradiation step, the glass substrate 1 in which the high density area 33 has been formed is immersed in an acidic solution such as hydrofluoric acid or the like, so that chemical etching can be performed on the glass substrate 1. Accordingly, as shown in FIG. 4, a projection 32 is formed continuously in the scanning direction of the pulse laser light L on the surface 1a of the glass substrate 1. As a result, a glass component 30 is manufactured that is the glass substrate 1 on the surface 1a of which the striated projection 32 has been formed.

According to the glass substrate processing method of the present embodiment, by scanning the pulse laser light L along the surface 1a of the glass substrate 1 as described above, the projection 32 is formed continuously in the scanning direction of the pulse laser light L, whereby improving the flexibility in designing of a glass component.

Note that in the present embodiment, scanning of the pulse laser light is performed linearly, however, the scanning of the pulse laser light may be performed in a curve or in a broken line in accordance with the desired shape of the projection 32. Moreover, the scanning of the pulse laser light is performed in a direction that is parallel with the surface of the glass substrate, however, the scanning of the pulse laser light may be performed in a direction that is perpendicular to the surface of the glass substrate (i.e., in the depth direction thereof) in accordance with the desired shape of the projection 32.

Moreover, in the present embodiment, a striated projection 32 is formed directly on the surface 1a of the glass substrate 1, however, the thin layer 11 may be formed on the glass substrate 1 and a striated projection may be formed on the thin layer 11 as in the above described second embodiment.

Specific Example of the First Embodiment

Specific examples according to the first embodiment of the present invention were selected as well as comparative examples that were intended to allow a comparison with the specific examples and performed the experiment described below on them. Firstly, the compositions of the glass substrates used in the specific examples and the comparative examples are shown in Table 1. Note that due to rounding error, the total of mol % of each component is not 100%.

TABLE 1

| Composition (mol %) | Composition A | Composition B | Composition C | Composition D |
|---|---|---|---|---|
| $SiO_2$ | 65 | 63 | 69 | 80.5 |
| $Al_2O_3$ | 10 | 12 | 11 | 2 |
| $B_2O_3$ | 0 | 0 | 9 | 13 |
| $Li_2O$ | 8 | 8 | 0 | 0 |
| $Na_2O$ | 10 | 10 | 0.1 | 4 |
| $K_2O$ | 0.2 | 0.2 | 0 | 0.4 |
| MgO | 3 | 3 | 3 | 0 |
| CaO | 4 | 4 | 7 | 0 |
| SrO | 0 | 0 | 1 | 0 |

Firstly, the glass substrates for Specific examples 1 to 3 and Comparative examples 1 to 3 from the glass substrates of the compositions A, B, C, and D shown in Table 1. Then the laser light satisfying the irradiation conditions given below was irradiated onto the glass substrate of each example. Note that the energy intensity of the laser light in each example is shown in Table 2.

Laser Light Irradiation Conditions

| | |
|---|---|
| Wavelength: | 800 nm |
| Pulse width: | 150 fs |
| Frequency: | 1000 Hz |
| Laser light scanning speed: | 0.25 mm/s |
| Depth of focal point: | 15 μm |

Next, each of the glass substrates onto which the laser light had been irradiated was immersed in the etching solutions with respective hydrofluoric acid concentrations shown in Table 2, and etching was performed. The heights of the projections that were formed on the surface of the respective glass substrates as a result of the etching are also shown in Table 2.

TABLE 2

| | Specific example 1 | Specific example 2 | Specific example 3 | Comparative example 1 | Comparative example 2 | Comparative example 3 |
|---|---|---|---|---|---|---|
| Glass composition | A | C | B | D | A | A |
| Energy intensity (J/cm$^2$) | 54.2 | 54.2 | 217 | 54.2 | 376 | 54.2 |
| Hydrofluoric acid concentration (percent by weight) | 0.1 | 0.1 | 0.1 | 0.2 | 0.1 | 4.5 |
| Etching time (min) | 150 | 150 | 150 | 600 | 150 | 8 |
| Height of projection (μm) | 1 | 0.25 | 0.2 | — | — | — |

In Comparative example 1, the composition of the glass substrate did not fall within a range in which the difference between the percentage content of the $SiO_2$ and the percentage content of the $Al_2O_3$ (i.e., the $SiO_2$ percentage content—the $Al_2O_3$ percentage content) was 40 mol % or more and 67 mol % or less. Therefore, no projection was formed in Comparative example 1.

In Comparative example 2, the energy intensity of the laser light was higher than 300 $J/cm^2$ and did not fall within the laser light energy intensity range defined in the present invention. Therefore, no projection was formed also in Comparative example 2.

In Comparative example 3, the hydrofluoric acid concentration of the etching solution was higher than 2 percent by weight and did not fall within the hydrofluoric acid concentration range defined in the present invention. Therefore, no projection was formed also in Comparative example 3.

The scope of the present invention is not limited to that in the above described embodiments, and various modifications may be made thereto insofar as they do not depart from the spirit or scope of the present invention.

For example, in each of the above described embodiments, a single pulse laser light is irradiated onto a glass substrate; however, it is also possible to form a plurality of projections on the surface of a glass substrate by irradiating a plurality of pulse laser lights simultaneously onto the glass substrate.

Furthermore, in each of the above described embodiments, pulse laser light is irradiated from above a glass substrate or above a thin layer directly downwards, however, pulse laser light may be irradiated in any direction as far as the irradiation is possible.

Note that the laser light may not be necessarily focused in a single spot within the glass substrate. For example, it is also possible to irradiate the laser light such that a variety of patterns are formed in the focal position using phase modulation or spatial modulation.

According to the glass substrate processing method of the present invention, since an area with lower etching rate can be formed on a glass substrate using laser light, it is possible to efficiently and with high precision form a projection that has a relatively minute and intricate shape on the surface of a glass substrate or on the surface of a thin layer formed on the glass substrate. A glass substrate on which such a projection has been formed can be used, for example, as a chemical chip for a μ-TAS (micro Total Analysis Systems) or the like. Moreover, through forming diffraction gratings and micro lenses and controlling the scattering or reflection of light or the like by the minute projection formed, the glass substrate can also be applied to a variety of optical components. Furthermore, it is possible to easily manufacture numerous types of glass components in small quantities.

What is claimed is:

1. A glass substrate processing method for forming a projection on a surface of a glass substrate comprising:

irradiating laser light onto the glass substrate such that the laser light is focused on a portion within the glass substrate, said irradiating forming a high density area around the portion where the laser light is focused that has a higher density and a lower etching rate than areas where the laser light was not irradiated such that the surface shape of the glass substrate is maintained in the surface shape thereof previous to irradiating the laser light; and forming the projection on the surface of the glass substrate by performing chemical etching on the glass substrate using an etching solution and by controlling the amount of the etching such that the high density area around the portion where the laser light is focused is allowed to remain.

2. The glass substrate processing method according to claim 1, wherein the glass substrate includes $SiO_2$ and 1 mol % or more of $Al_2O_3$, and a difference between the percentage content of the $SiO_2$ and the percentage content of the $Al_2O_3$ is 40 mol % or more and 67 mol % or less.

3. The glass substrate processing method according to claim 2, wherein the difference between the percentage content of the $SiO_2$ and the percentage content of the $Al_2O_3$ is 47 mol % or more and 57 mol % or less.

4. A glass substrate processing method for forming a projection on a surface of a thin layer composed of one or more layers of inorganic material and formed on the glass substrate, comprising:

irradiating laser light onto the thin layer such that the laser light is focused on a portion within the thin layer, said irradiating forming a high density area around the portion where the laser light is focused that has a higher density and a lower etching rate than areas where the laser light was not irradiated such that the surface shape of the thin layer is maintained in the surface shape thereof previous to irradiating the laser light; and forming the projection on the surface of the thin layer by performing chemical etching on the thin layer using an etching solution and by controlling the amount of the etching such that the high density area around the portion where the laser light is focused is allowed to remain.

5. The glass substrate processing method according to claim 4, further comprising:

performing a second etching on the thin layer and the glass substrate from the side of the surface of the thin layer after the projection has been formed on the surface of the thin layer thereby foaming a new projection on the surface of the glass substrate such that the projection of the thin layer is reflected in the glass substrate.

6. The glass substrate processing method according to claim 5, wherein an etching rate of the etching for the glass substrate is higher than an etching rate of the etching for the thin layer.

7. The glass substrate processing method according to claim 4, wherein the thin layer is formed of a glassy material containing $SiO_2$ as a main component and containing at least $Al_2O_3$.

8. The glass substrate processing method according to claim 1 or 4, wherein the laser light is pulse laser light.

9. The glass substrate processing method according to claim 8, wherein an energy intensity of single pulse of laser light per unit area at a focal position of the pulse laser light is less than 150 $J/cm^2$.

10. The glass substrate processing method according to claim 9, wherein an energy intensity of single pulse of laser light per unit area at a focal position of the pulse laser light is more than 5 $J/cm_2$.

11. The glass substrate processing method according to any one of claim 2, 3 or 7, wherein the laser light is pulse laser light, and an energy intensity of single pulse of laser light per unit area at a focal position of the pulse laser light is more than 5 $J/cm_2$ and less than 300 $J/cm^2$.

12. The glass substrate processing method according to claim 1 or 4 wherein the etching solution is a hydrofluoric acid solution with not more than two percent by weight of concentration.

13. The glass substrate processing method according to claim 1 or 4, further comprising:
moving the laser light in at least one of the directions that is parallel with and perpendicular to the surface of the glass substrate during the laser light irradiation.

14. The glass substrate processing method according to claim 1 or 4, further comprising:
varying the energy intensity of the laser light during the laser light irradiation.

* * * * *